United States Patent [19]

Laboe

[11] Patent Number: 5,042,845
[45] Date of Patent: Aug. 27, 1991

[54] FILLER ADAPTER

[75] Inventor: Mark Laboe, Maple Grove, Minn.

[73] Assignee: Twin City Hose, Inc., Maple Grove, Minn.

[21] Appl. No.: 421,847

[22] Filed: Oct. 16, 1989

[51] Int. Cl.⁵ .............................................. F16L 35/00
[52] U.S. Cl. ..................................... 285/38; 285/179; 285/334.5
[58] Field of Search ....................... 285/38, 334.5, 179

[56] References Cited

U.S. PATENT DOCUMENTS

| | | | |
|---|---|---|---|
| 327,737 | 10/1885 | Strong | 285/38 |
| 2,122,616 | 7/1938 | Lamont | 285/334.5 X |
| 2,190,419 | 2/1940 | Evarts | 285/38 X |

Primary Examiner—Dave W. Arola
Attorney, Agent, or Firm—Hugh D. Jaeger

[57] ABSTRACT

Filler adapter for unrestricted connecting between a tank, such as bottled gas, and a hose. A sleeve with a "T"-handle distant from an end connection aligns over a central tube for attachment to the tank and to which a hose is attached at the other end. The "T"-handle is rotated to join the hose and the central tube securely to the tank valve without interference from the tank handle and tank protecting members and without the aid of wrenches or other tightening devices. An alternative embodiment includes a device with an angled and curved central tube.

2 Claims, 3 Drawing Sheets

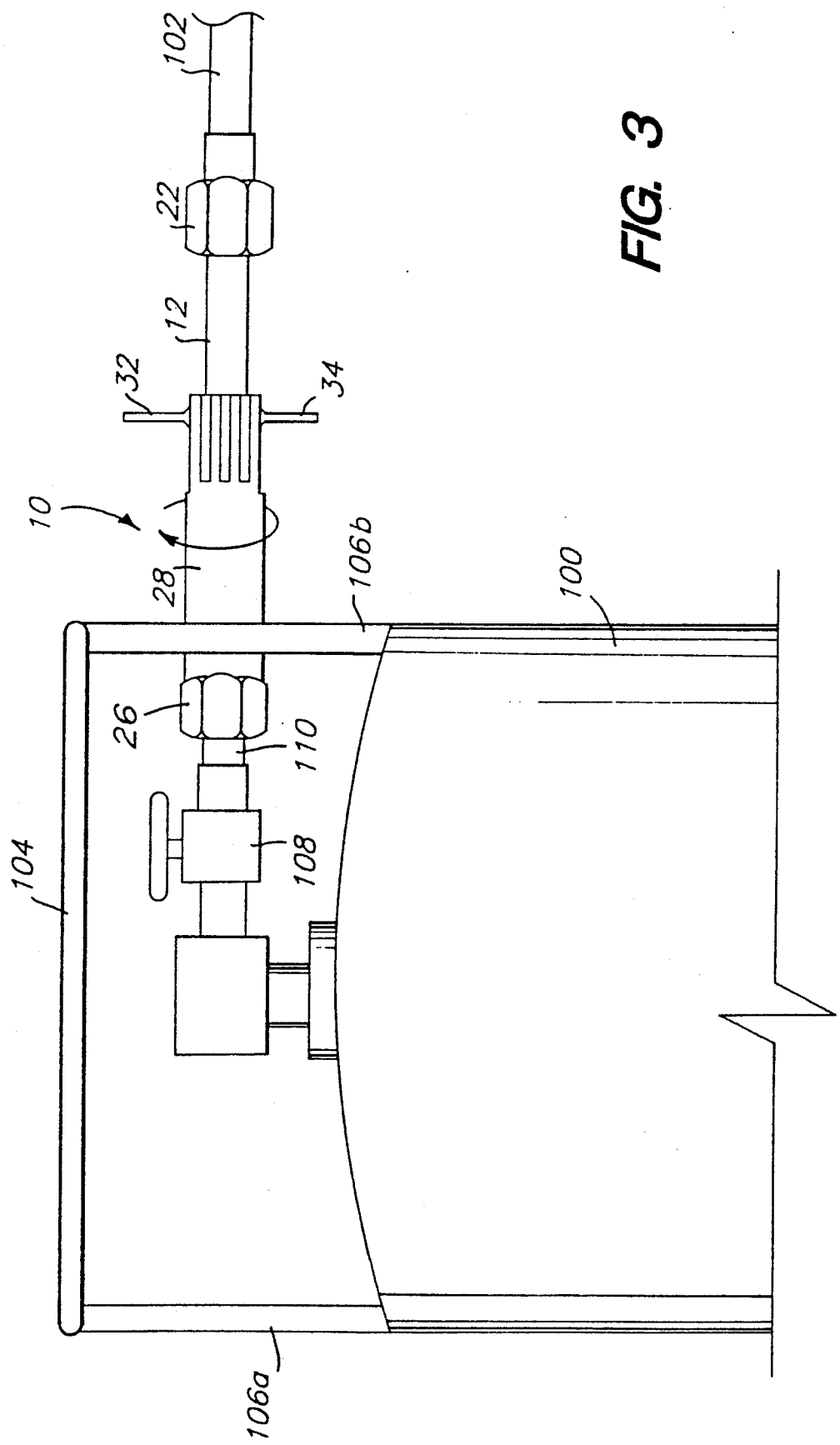

FILLER ADAPTER

BACKGROUND OF THE INVENTION

1. Field of the Invention

The present invention relates to a tank connector, and more particularly, relates to a "T"-handled filler adapter distant to the tank appendages for connection to a gas tank without tank appendage interference.

2. Description of the Prior Art

Prior art methods of connecting a hose to a tank included the method of attaching a hose to a valve on a tank in a crowded area at the top of a tank. Working in close quarters was difficult, at best, when attempting to insert a wrench to turn and tighten a connector, such as a hose connector, to the tank valve. Scraped knuckles, injured hands, stripped nuts and damage to cylinders and hoses, not to mention the grief, aggravation and loss of valuable working time were common.

The present invention overcomes the disadvantages of the prior art by providing a filler adapter where the tightening devices are remote and distant from the tank components to facilitate ready unrestricted connection of the filler adapter to a tank.

SUMMARY OF THE INVENTION

The general purpose of the present invention is to provide a filler adapter for connection to a tank.

According to one embodiment of the present invention, there is provided a central tube with flared ends, multi-radius collars, a nut and a slidable coupler concentric to, over and about a central tube, and a hexagonal coupler with "T"-handled members at opposing ends of the slidable coupler.

One significant aspect and feature of the present invention is a filler adapter for attachment to a tank, and between a tank and a hose or other member.

Having thus described one embodiment of the present invention, it is the principal object hereof to provide a filler adapter where the operational components of the invention do not interfere, nor are interfered with by surrounding tank component members.

Another object of the present invention is a filler adapter requiring no tools for attachment to a tank.

Another object of the present invention is the extension for connection, such as to a hose.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
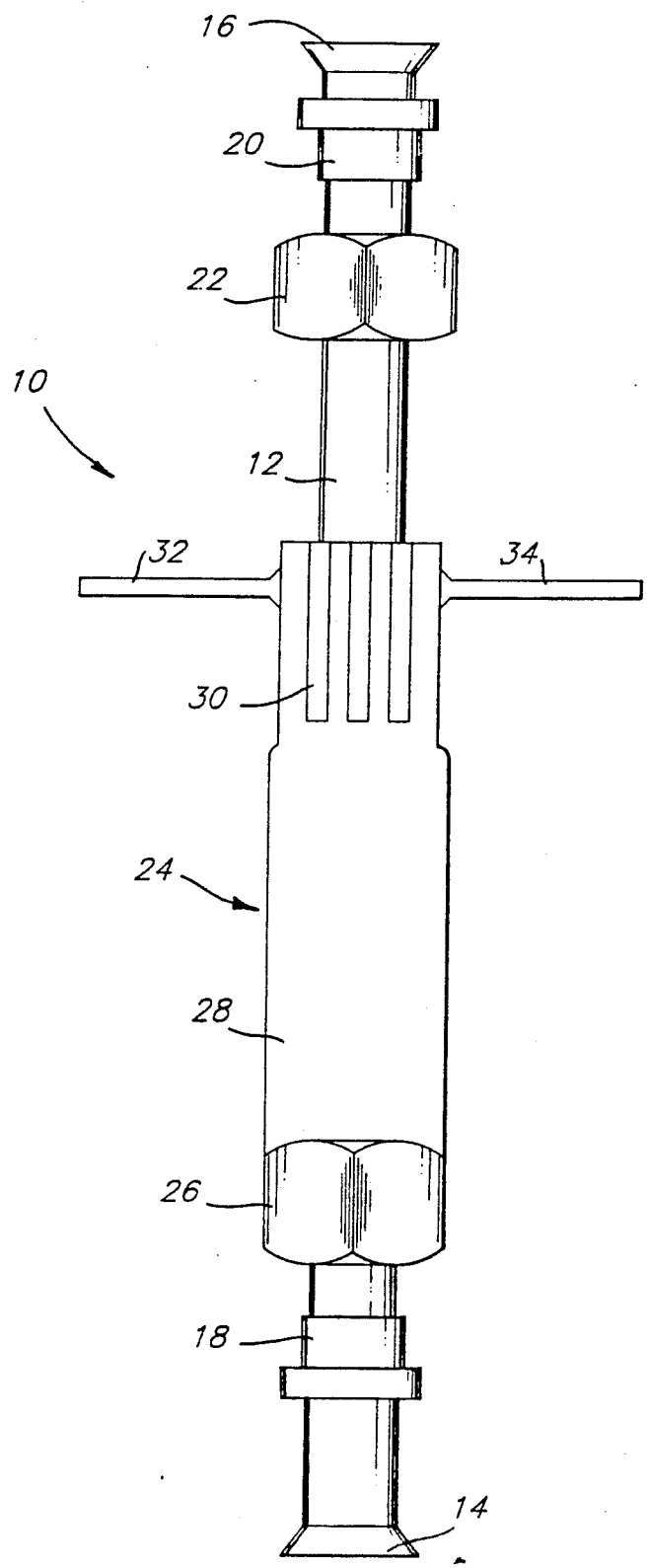
FIG. 1 illustrates a plan view of the filler adapter, the present invention.

FIG. 1 illustrates a plan view of a filler adapter 10 including a stainless steel central tube 12, flared ends 14 and 16 at the extreme of the stainless steel central tube 12, and opposing multi-radius collars 18 and 20 concentric to the stainless steel central tube 12. A hexagonal coupling 22 with internal threads aligns over the stainless steel central tube 12 and slides along and over the stainless steel central tube 12, the opposing multi-radius collar 20 and the flared end 16 to couple the filler adapter 10 to a tank of gas or liquid source, such as nitrogen, argon, oxygen, etc. A slidable coupler 24, in the form a "T"-handle, aligns coaxially over and about the stainless steel central tube 12 and includes a hexagonal internally threaded coupling 26 secured, such as by welding, to one end of a tube 28. The tube 28 aligns coaxially over and about the stainless steel central tube 12 and also includes a fluted surface 30 at one end. Opposing "T"-handled members 32 and 34 extend radially from the fluted surface 30 of the tube 28. The slidable coupler 24 slides along and over the stainless steel central tube 12, the opposing multi-radius collar 18 and the flared end 14 to couple the flared end 14 of the stainless steel central tube 12 to the cylinder of gas or liquid. The slidable coupler 24 rotatably engages an orifice connector of the recipient cylinder by actuation of the "T"-handled members 32 and 34 to cause the inner threads of the hexagonal internally threaded coupling end 26 to engage the recipient member threads.

Figure 2:
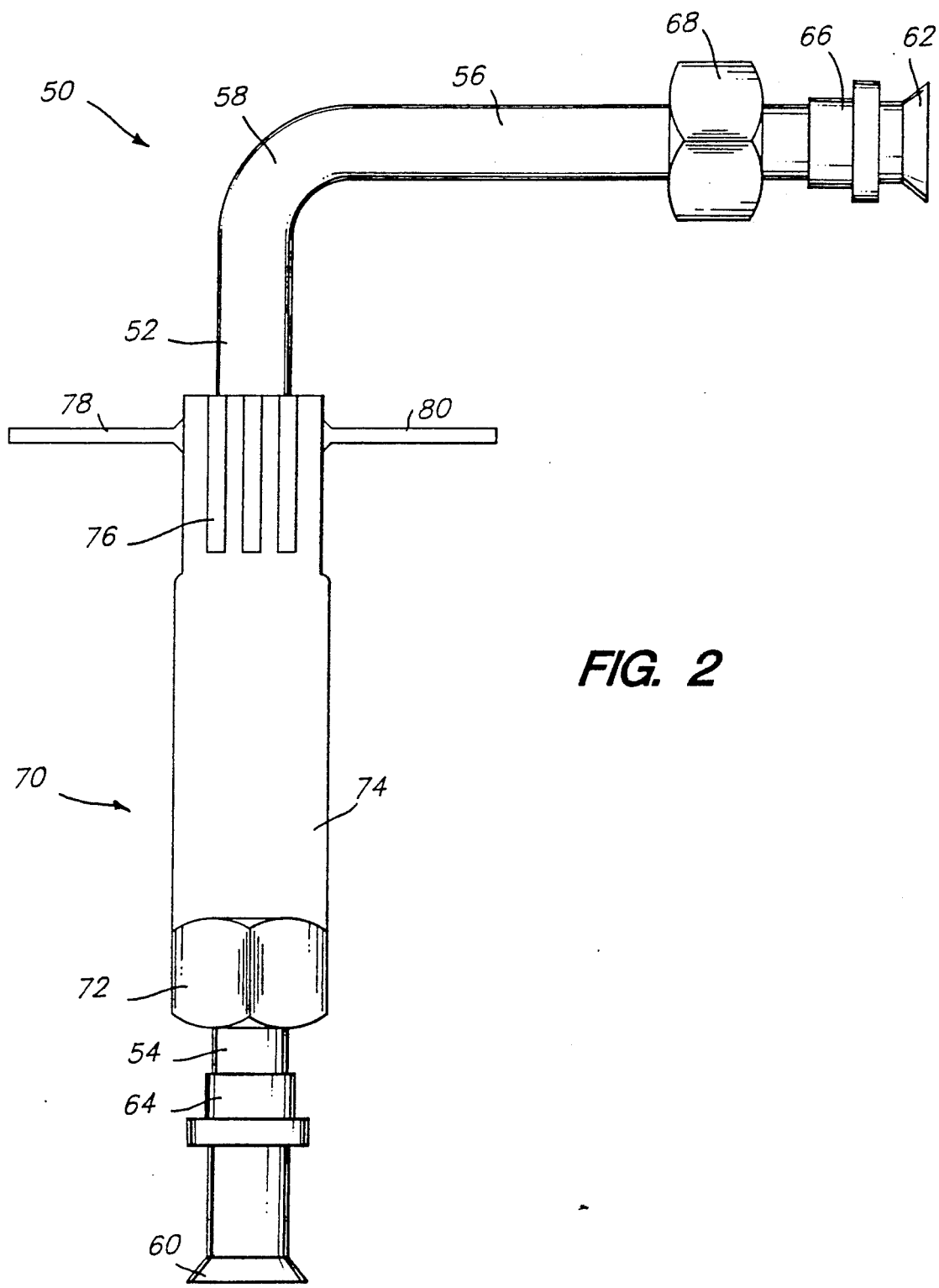
FIG. 2, an alternative embodiment, illustrates a plan view of a filler adapter with an angled central tube; and, FIG. 3 illustrates a plan view of a filler adapter connected between a tank and a hose.

FIG. 2 illustrates an alternative embodiment of a plan view of a stainless steel filler adapter 50 for use in restricted or other areas including a stainless steel central tube 52 with a horizontal tube portion 54, a vertical tube portion 56 at about a substantially right angle to the horizontal tube portion 54 and a curved portion 58 therebetween. The vertical tube portion 56 is illustrated at the right angle to the horizontal tube portion 54 for purposes of illustration only and may be at any convenient angle as usage dictates, and is not considered to be limiting of the scope of the present invention. An angle of bend of 1°–90° can be utilized. The stainless steel central tube 52 includes a flared end 60 at one end of the horizontal tube portion 54, a flared end 62 at one end of the vertical tube portion 56, a multi-radius collar 64 concentric to and over the horizontal tube portion 54 and adjacent to the flared end 60, and a multi-radius collar 66 concentric to and over the vertical tube portion 56 and adjacent to the flared end 62. A hexagonal coupling 68 with internal threads aligns over the vertical portion 56 of the stainless steel central tube 52 and slides along and over the vertical portion 56, the multi-radius collar 66 and the flared end 62 to couple the filler adapter 50 to a gas or liquid source. A slidable coupler 70 in the form of a "T"-handle aligns coaxially over and about the horizontal portion 54 of the stainless steel central tube 52, and includes a hexagonal internally threaded coupling 72 secured, such as by welding, to one end of a tube 74. The tube 74 aligns coaxially over and about the stainless steel central tube 52 and also includes a fluted surface 76 at one end. Opposing "T"-handled members 78 and 80 extend radially from the fluted surface 76 of the tube 74. The slidable coupler 70 slides along and over the horizontal portion 54, the multi-radius collar 64 and the flared end 60 to couple the flared end 60 of the stainless steel central tube 52 to the liquid or gas cylinder. The slidable coupler 70 rotatably engages an orifice connector of the recipient cylinder in the same manner as described in FIG. 1.

MODE OF OPERATION

FIG. 3 best illustrates a plan view of the mode of operation where the filler adapter 10 connects between a tank 100 and a hose 102. The tank 100 includes a circular handle 104 supported by a plurality of vertical supports 106a-106n, a gas valve 108 and a threaded pipe end 110. In the prior art, the hose 102 was connected directly to the threaded pipe end 110 wherein difficulty in tightening hose components 102 on the threaded pipe end 110 were due to the interfering proximity of the circular handle 104 and the vertical supports 106a-106n.

In the present invention, the hose 102 is secured to the hexagonal coupling 22 of the filler adapter 10. The hexagonal internally threaded coupling 26 of the filler adapter 10 with the hose 102 attached is then placed against the threaded pipe end 110 and the "T"-handled members 32 and 34 are rotated to tighten the hexagonal internally threaded coupling 26 over and about the threaded pipe end 110. The "T"-handled members 32 and 34 are spaced from the tank circular handle 104 and vertical supports 106a-106n so that no interference is encountered in the tightening or untightening process. The alternative embodiment filler adapter 50 functions in a similar fashion and includes a 90° bend to angle the connecting hose parallel to the tank 100, thus relieving any bending movement or fatigue placed on a connecting hose.

Various modifications can be made to the present invention without departing from the apparent scope hereof.

I claim:

1. Filler adapter comprising:
   a. a central tube including radially outwardly flared ends;
   b. opposing multi-radius collars about each end of said tube each collar having cylindrical portions, each radius associated with a cylindrical portion of increasing size toward said flared end, said cylindrical portions including at least one shoulder therebetween, each collar having an internal flare substantially equal to the flare on said flared end for engagement with the associated flared end of said tube;
   c. a hexagonal coupling means at one end of said tube; and,
   d. an integral slidable coupler at an other end of said tube including in order a threaded coupling means, a tube, a fluted end and "T" handles extending therefrom, said hexagonal coupling means and said threaded coupling means each having a stepped bore therein defining a shoulder portion which abuts said shoulder on said collars when said coupling means are coupled to recipient members.

2. Filler adapter comprising:
   a. a central tube including radially outwardly flared ends and a bend of 1°-90°;
   b. opposing multi-radius collars about each end of said tube, each collar having cylindrical portions, each radius associated with a cylindrical portion of increasing size toward said flared end, said cylindrical portions including at least one shoulder therebetween, each collar having an internal flare substantially equal to the flare on said flared end for engagement with the associated flared end of said tube;
   c. a hexagonal coupling means at one end of said tube; and,
   d. an integral slidable coupler at an other end of said tube including in order a threaded coupling means, a tube, a fluted end and "T" handles extending therefrom, said hexagonal coupling means and said threaded coupling means each having a stepped bore therein defining a shoulder portion which abuts said shoulder on said collars when said coupling means are coupled to recipient members.

* * * * *